United States Patent [19]
Kitada et al.

[11] Patent Number: 6,075,928
[45] Date of Patent: Jun. 13, 2000

[54] MULTI-FUNCTION IMAGE PROCESSING SYSTEM

[75] Inventors: Takashi Kitada, Ogori; Yoshitsugu Hayashi, Fukuoka, both of Japan

[73] Assignee: Matsushita Electric Industrial Co., Ltd., Osaka, Japan

[21] Appl. No.: 08/628,799

[22] Filed: Apr. 5, 1996

[30] Foreign Application Priority Data

Apr. 10, 1995 [JP] Japan .................................. 7-083871

[51] Int. Cl.⁷ .................................................. G06F 15/00
[52] U.S. Cl. .......................................... 395/114; 395/112
[58] Field of Search ................................. 395/114, 112, 395/115, 116, 101, 113, 830, 868, 106, 111, 117; 358/404, 407, 444, 468, 403, 448, 442, 401, 296, 443; 347/2, 3, 5

[56] References Cited

U.S. PATENT DOCUMENTS

| | | | |
|---|---|---|---|
| 4,947,345 | 8/1990 | Paradise et al. | 358/442 |
| 5,280,585 | 1/1994 | Kochis et al. | 358/442 |
| 5,299,296 | 3/1994 | Padalino et al. | 395/112 |
| 5,307,462 | 4/1994 | Hastings | 395/830 |
| 5,377,016 | 12/1994 | Kashiwagi et al. | 358/403 |
| 5,396,345 | 3/1995 | Motoyama | 358/448 |

*Primary Examiner*—Edward L. Coles
*Assistant Examiner*—Dov Popovici
*Attorney, Agent, or Firm*—Stevens, Davis, Miller & Mosher, L.L.P.

[57] ABSTRACT

A multi-function image processing system smooth in operation and high in reliability having the functions of a fax and a printer is disclosed. An image is printed by a print engine, data are transmitted and received by a host interface and processed by a print data processing section which produces print data. The print data are transmitted to the print engine through a printer engine interface. The connection with the public line is controlled by a channel controller. On the other hand, an original is converted into image data by a reader, which image data are processed and print data produced by a fax controller. The print data are transmitted to the print engine by a fax engine interface. The transmission and receiving of the print data and the control data are arbitrated by an engine interface arbiter between the print engine interface and the fax engine interface on one hand and the print engine on the other hand.

14 Claims, 10 Drawing Sheets

MULTI-FUNCTION IMAGE PROCESSING SYSTEM

BACKGROUND OF THE INVENTION

1. Field of the Invention

The present invention relates to a multi-function image processing system having a function as a printer for printing letters from an external host computer or the like and a function as a facsimile (hereinafter referred to as the "fax") for transmitting and receiving data using a communication line.

2. Description of the Related Art

In recent years, the use of what is called a multi-function image processing system capable of performing a variety of functions has extended in place of stand-alone equipment such as faxes, printers and copiers for saving required space and reducing total cost.

A multi-function image processing system with dual functions of fax and printer has been developed, in which a conventional fax having a scanner function is combined with a printer having an interface with a host computer. This system can thus realize copying and scanning functions as well as functions of a fax and a printer.

A conventional multi-function image processing system will be described. FIG. 10 is a block diagram showing a conventional multi-function image processing system configured on the basis of a fax and a printer. Reference numeral 21 designates a conventional multi-function system comprising three main parts including a print engine 9, a fax control unit 22 and a printer control unit 23.

Further, numeral 2 designates a host computer for issuing a command for execution of application software or data processing. The host computer 2 transmits print data to the multi-function system 21. Also, numeral 25 designates a print engine controller functioning as a control interface between the print engine 9 and the printer control unit 23.

In the fax control unit 22, numeral 3 designates a public line for transmitting and receiving data to and from a remote terminal, numeral 4 a channel controller for controlling the interface with the public line 3, and numeral 5 a reader for scanning an original and converting it into image data. Numeral 6 designates a fax controller for controlling the conversion of an original into an electrical signal at the reader 5, processing the data transmitted to and received from the public line 3, converting the data received from the public line 3 into fax print data or otherwise controlling the whole operation of the fax control unit 22.

In the printer control unit 23, numeral 7 designates a host interface for transmitting and receiving data to and from the host computer 2, numeral 8 a print data processing section, and numeral 24 a print engine interface. The print data processing section 8, which processes the data received from the host computer 2 and produces print data, also transmits the print data through the print engine interface 24 to the print engine controller 25 and thereby controls the whole operation of the print control unit 23. Numeral 26 designates a printer-fax interface, through which data are transmitted and received between the printer control unit 23 and the fax control unit 22.

Explanation will be made about the operation of the conventional multi-function image processing system configured as described above. First, data to be printed sent from the host computer 2 are received through the host interface 7. The print data processing section 8 produces print data on the basis of the received data.

Then, when the print data are prepared, the print data processing section 8 generates a print request signal to the print engine controller 25 through the print engine interface 24, thereby making a print request. Then, the print engine 9 performs a predetermined printing operation in accordance with the print request if it is ready for printing. A vertical sync signal (hereinafter referred to as the "TOP signal") and a horizontal sync signal (hereinafter referred to as the "HSYNC signal") for synchronizing the printing operation are applied to the printer control unit 23. The print data processing section 8 sends the print data to the print engine controller 25 based on the TOP signal and the HSYNC signal, with the result that the printing operation is performed by the print engine 9.

The data received by the fax control unit 22 through the channel controller 4 from the public line 3 are processed by the fax controller 6. Fax print data are produced on the basis of the data thus processed. Upon preparation of the fax print data, the fax controller 6, which is not directly connected with the print engine controller 25, communicates with the print data processing section 8 of the printer control unit 23 through the printer interface 26. In response to this communication, the printer control unit 23 communicates with the print engine controller 25, so that a print request signal representing a print request is applied to the print engine 9.

As far as the print engine 9 is ready for printing operation in the meantime, a predetermined printing operation is performed by the print engine 9 in accordance with the print request. The TOP signal and the HSYNC signal are then applied to the print data processing section 8 from the print engine 9 through the print engine controller 25 and the print engine interface 24. The fax control unit 22 transfers the fax print data to the printer control unit 23 through the printer fax interface 26 in advance. The print data processing section 8 transfers the print data to the print engine controller 25 on the basis of the TOP signal and the HSYNC signal, so that the print data are sent to the print engine 9, thereby executing the printing operation.

In the above-mentioned conventional configuration, however, the print engine interface 24 for transmitting and receiving data to and from the print engine controller 25 is provided on only a selected one of the fax control unit 22 and the printer control unit 23. In fact, the print engine interface 24 is provided only on the printer control unit 23 in the conventional system under consideration.

In the case where the fax control unit 22 prints an image on the basis of the print data received from the public line 3, therefore, communication is necessary beforehand with the print engine 9 through the printer control unit 23. If data are sent from the host computer 2 to the printer control unit 23 during the communication between the fax control unit 22 and the print engine 9, the printer control unit 23 is incapable of receiving the data, and the rejection of a print request is displayed on the display unit of the host computer 2. The host computer 2 therefore cannot transfer to the next task during the printing operation.

Also, the configuration in which the printer-fax interface 26 is interposed between the fax control unit 22 and the printer control unit 23 requires hardware such as a bidirectional port or a memory shared by the two controllers. The result is a complicated control operation and an increased processing time, thereby leading to the problem of an increased system cost.

SUMMARY OF THE INVENTION

The object of the present invention, which is intended to solve the above-mentioned problems, is to provide a multi-function image processing system comprising a fax control unit and a printer control unit sharing a print engine thereby to effectively utilize resources and assure a smooth operability and a high reliability.

In order to achieve this object, according to the present invention, there is provided a multi-function image processing system comprising a print engine for printing images based on print data, a host interface for transmitting and receiving data to and from a host computer or the like, a print data processing section for processing data received from the host interface and producing print data, a printer engine interface for transmitting print data to the print engine from the print data processing section, a channel controller for controlling the interface with a public line, a reader for scanning and converting an original into an image data signal, a fax controller for processing the image data received from the channel controller and producing print data, a fax engine interface for transmitting print data from the fax controller to the print engine, and an engine interface arbiter for arbitrating the transmission and receipt of print data and control data between the print engine interface or the fax engine interface on one hand and the print engine on the other hand.

In this configuration, the engine interface arbiter arbitrates the transmission and receipt of print data, fax print data and control data between the print engine interface or the fax engine interface and the print engine. When printing data, therefore, each control unit can communicate with or transfer print data to the print engine directly through the print engine interface in the particular controller unit as in the case of the conventional stand-along equipment. A complicated control software and the interface between the printer control unit and the fax control unit thus are eliminated for an improved operability. Also, the appearance is presented from each control unit as if only one print engine is connected and, from the print engine, as if only one control unit is connected. The control software can thus be easily realized.

DESCRIPTION OF THE PREFERRED EMBODIMENTS

A multi-function image processing system according to an embodiment of the invention will be described below with reference to the accompanying drawings.

(Embodiment 1)

Figure 1:
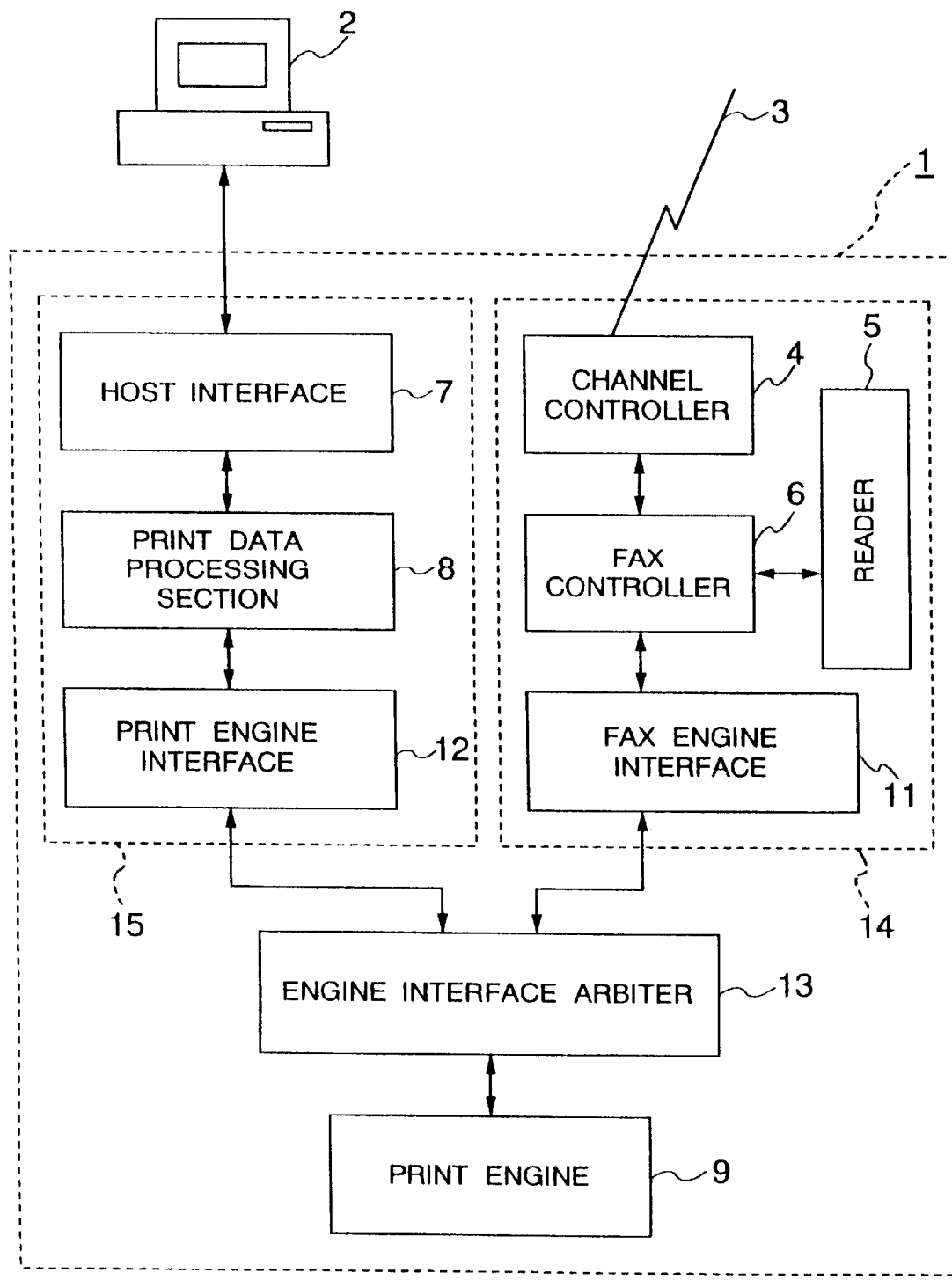
FIG. 1 is a block diagram showing a configuration of a multi-function image processing system according to a first embodiment of the invention.
Figure 2:
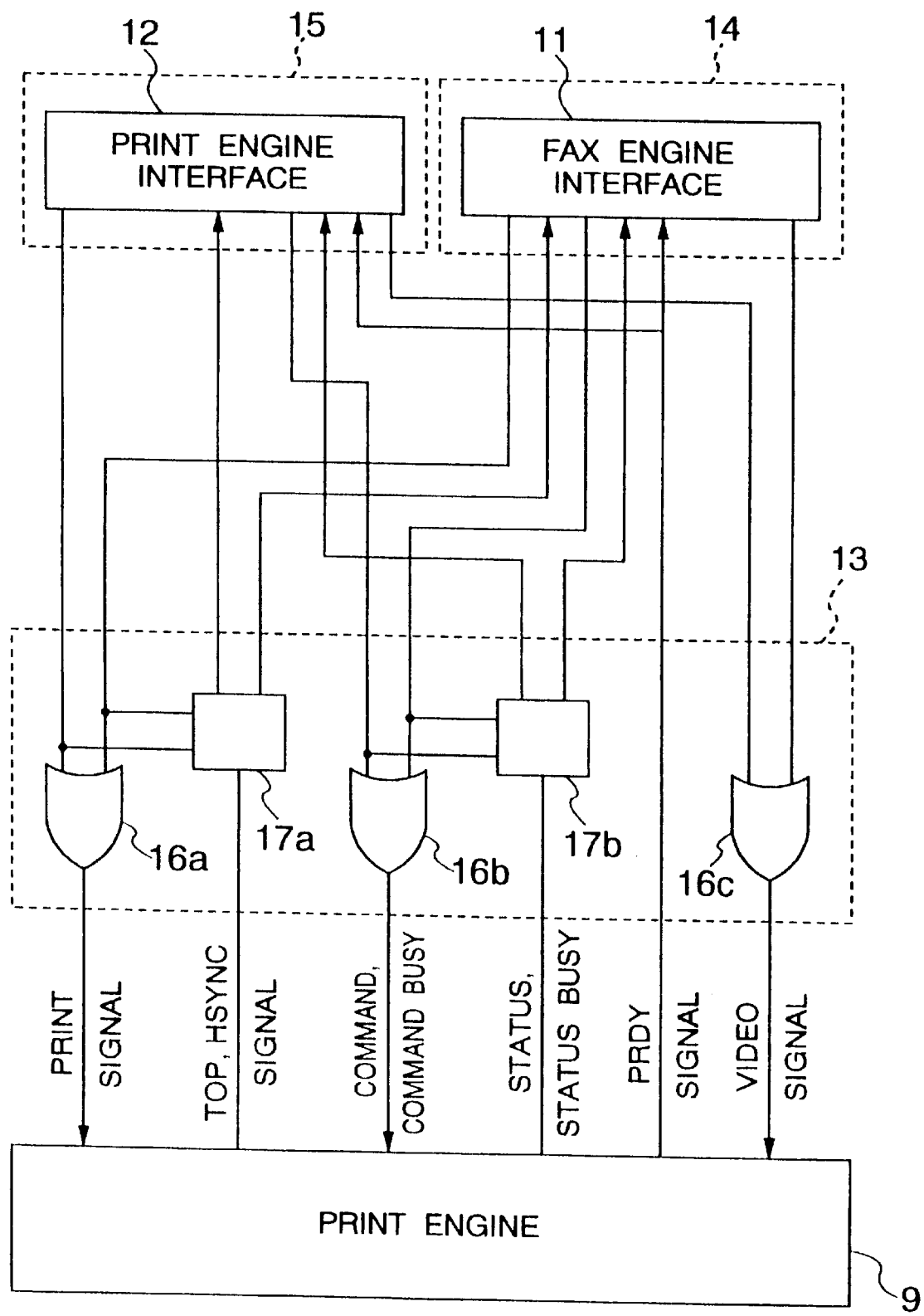
FIG. 2 is a circuit diagram showing the essential parts of an engine interface arbiter of a multi-function image processing system according to the first embodiment of the invention.

FIG. 1 is a block diagram showing a configuration of a multi-function image processing system according to a first embodiment of the invention, and FIG. 2 a diagram showing a hardware configuration of the essential parts of an engine interface arbiter of a multi-function image processing system according to the first embodiment of the invention. In FIG. 1, reference numeral 1 designates a multi-function image processing system according to the first embodiment of the invention, numeral 2 a host computer, numeral 3 a public line, numeral 4 a channel controller, numeral 5 a reader, numeral 6 a fax controller, numeral 7 a host interface, numeral 8 a print data processing section, and numeral 9 a print engine. These component parts, which are similar to the corresponding parts in the conventional system, are designated by the same reference numerals respectively as in the prior art and will not be described any further. The component parts according to the present embodiment not included in the conventional system are a fax engine interface 11, a print engine interface 12 and an engine interface arbiter 13.

The engine interface arbiter 13 arbitrates the printing operation on the print engine 9 between the fax engine interface 11 and the print engine interface 12. Numeral 14 designates a fax control unit including the channel controller 4, the reader 5, the fax controller 6 and the fax engine interface 11. Numeral 15 designates a printer control unit including the host interface 7, the print data processing section 8 and the print engine interface 12.

Now, the engine interface arbiter 13 will be described in detail with reference to FIG. 2. The signal flow of only main data signals and control signals is described. In FIG. 2, numeral 11 designates the fax engine interface, numeral 12 the print engine interface, and numeral 13 the engine interface arbiter. The engine interface arbiter 13 includes two-input OR circuits 16a, 16b, 16c, and switching control circuits 17a, 17b each with a demultiplexer for determining the connection in accordance with the inputs to the OR circuits 16a, 16b. The OR circuit 16a takes the logic sum between the print request signals from the fax engine interface 11 and the print engine interface 12 and applies it to the print engine 9. The OR circuit 16b receives a command and a command-busy signal from the fax engine interface 11 and the print engine interface 12 and applies the logic sum (OR) thereof to the print engine 9. The OR circuit 16c receives print signals constituting video signals from the fax engine interface 11 and the print engine interface 12 and applies the logic sum (OR) of the video signals to the print engine 9. The switching control circuit 17a has the function of returning control signals including a TOP signal and a HSYNC signal representing the timing of the print signal produced from the print engine 9, to the engine interface of the fax engine interface 11 or the printer engine interface 12, whichever first generates an active print request signal.

The operation of the multi-function image processing system according to the first embodiment of the invention configured as described above will be described with reference to FIGS. 1 and 2. First, the printer control unit 15 receives data from the host computer 2 through the host interface 7, and the print data processing section 8 produces print data based on the received data. When the print data are prepared, the print data processing section 8 requests the printing by generating a print request signal to the print engine 9 through the print engine interface 12 and the OR circuit 16a of the engine interface arbiter 13. The print engine 9, whenever ready for printing, executes a predetermined sequence of printing processes in accordance with the print request, so that the TOP signal and HSYN signal from the print engine 9 are applied only to the printer control unit 15 through the switching control circuit 17a constituting a demultiplexer.

In the process, since the print request signal is received from the printer control unit 15, the TOP signal and the HSYNC signal are not applied to the fax engine interface 11. The print data processing section 8 thus applies the print data to the print engine 9 through the OR circuit 16c on the basis of the TOP signal and the HSYNC signal for carrying out the printing operation.

The data received by the fax control unit 14 from the public line 3, on the other hand, is processed by the fax controller 6 through the channel controller 4, and print data are produced on the basis of the data thus processed. When the print data are prepared, the fax controller 6 generates a print request signal from the fax engine interface 11, which is transmitted through the OR circuit 16a of the engine interface arbiter 13 to request the printing operation of the print engine 9. The print engine 9, when ready for printing operation, performs a predetermined printing control operation in accordance with the print request, so that the TOP signal and the HSYNC signal from the print engine 9 are applied only to the fax control unit 14 through the switching control circuit 17a constituting a demultiplexer. In the process, since the print request signal is received first from the fax control unit 14, the control signals including the TOP signal and the HSYNC signal are not applied to the printer control unit 15. The fax controller 6 transmits the print data as a video signal to the print engine 9 through the OR circuit 16c according to the TOP signal and the HSYNC signal thereby to perform the printing operation.

In the case where the control unit 14 or 15 applies a command or a command-busy signal indicating that the command is in "enable" state to the print engine 9, the command or the command-busy signal, as the case may be, is applied through the OR circuit 16b of the engine interface arbiter 13 to the print engine 9. Upon receipt of this signal, the print engine 9 returns a status signal or a status-busy signal indicating a busy status through the input terminal of the OR circuit 16b and the switching control circuit 17b constituting a multiplexer to the control unit which has generated a command or a command-busy signal. Neither the status signal nor the status-busy signal is applied to the control unit which has not generated a command or a command-busy signal.

A PRDY signal indicating that the print engine 9 is not in error condition but ready for printing is directly connected to the control units 14 and 15 as shown in FIG. 2. A PRDY (print ready) signal may be confirmed by the control units 14 and 15 immediately before generation of a print request signal, and the same PRDY signal may be applied to the control units 14 and 15.

Figure 10:
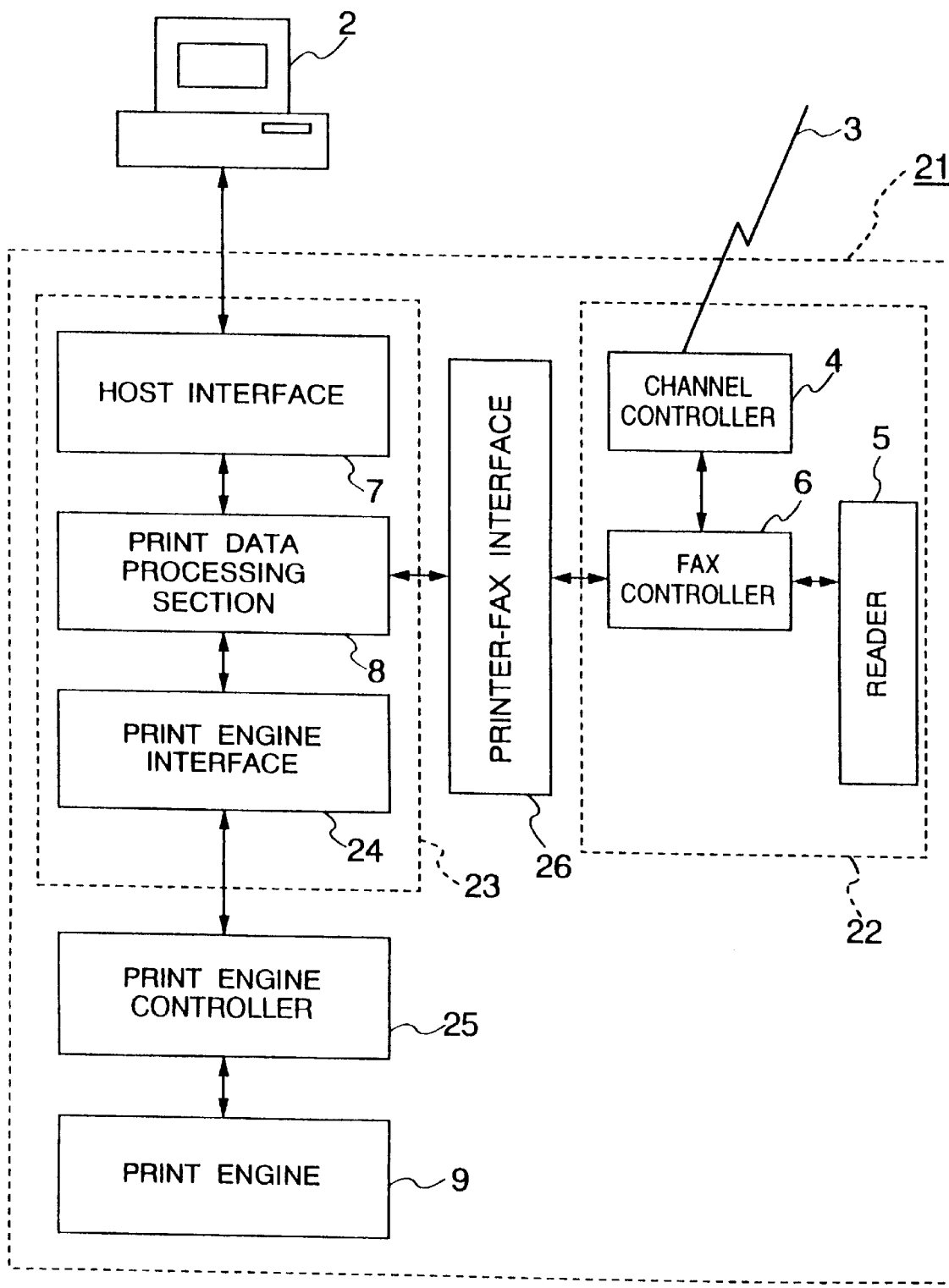
FIG. 10 is a block diagram showing a configuration of a conventional multi-function image processing system.

As described above, according to this embodiment, the need of a printer-fax interface is eliminated between the fax control unit 14 and the print control unit 15 as in the conventional system shown in FIG. 10. The system, as viewed from each control unit, therefore, presents an appearance as if only one print engine 9 is connected, while the system configuration as viewed from the print engine is virtually constructed as if a single control unit is connected.

As a consequence, the control units 14 and 15 are easily controlled, high in operability and can be easily supported in hardware, thereby leading to a reduced cost and an improved mass productivity.

(Embodiment 2)

Figure 3:
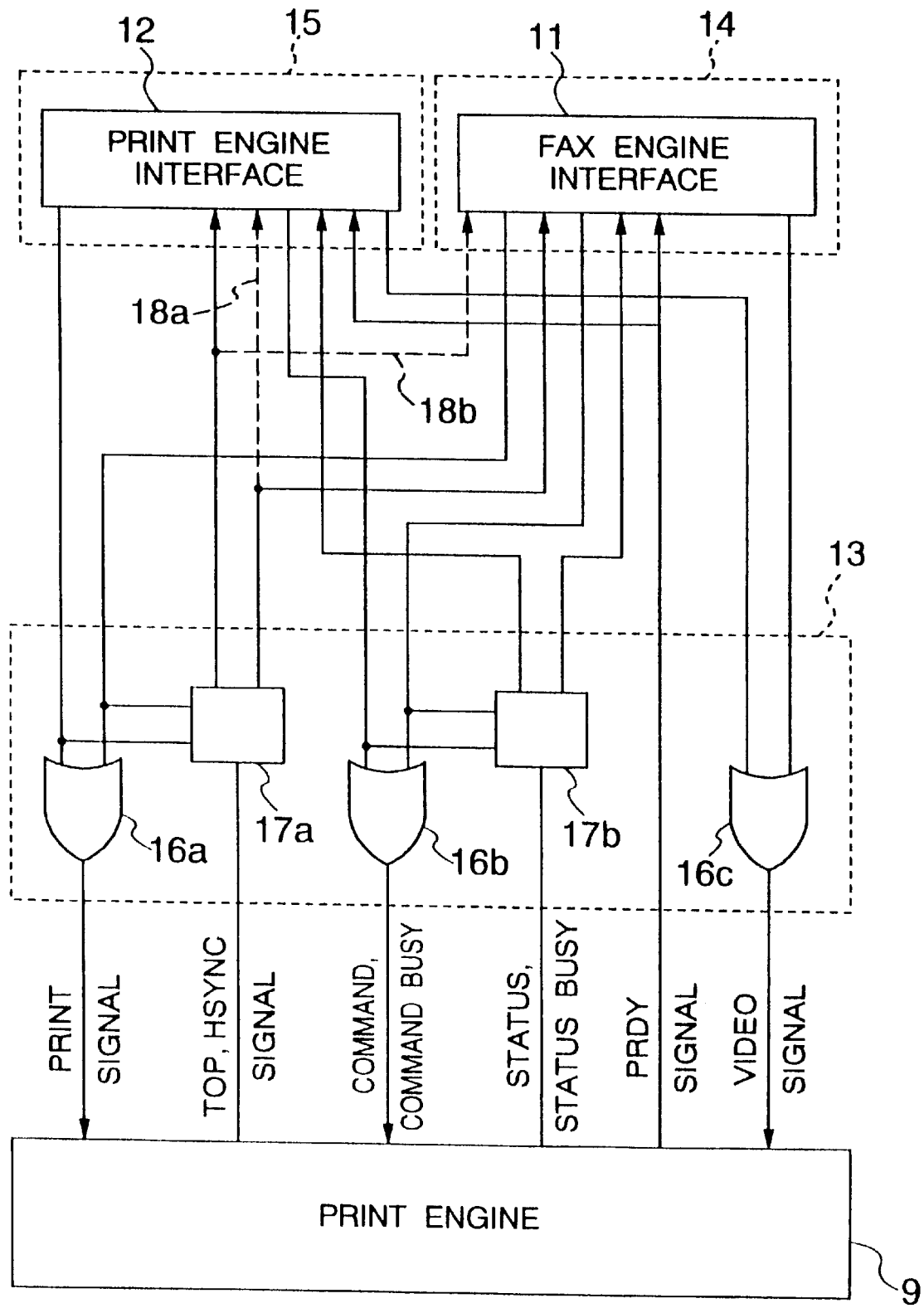
FIG. 3 is a circuit diagram showing the essential parts of an engine interface arbiter of a multi-function image processing system according to a second embodiment of the invention.

A multi-function image processing system according to a second embodiment of the invention will be described with reference to the accompanying drawings. The configuration of the multi-function image processing system according to the second embodiment is similar to that of the first embodiment shown in FIG. 1. FIG. 3 is a circuit diagram showing the essential parts of the engine interface arbiter 13 shown in FIG. 1. Numeral 9 designates a print engine, numeral 11 a fax engine interface, numeral 12 a print engine interface, numeral 13 an engine interface arbiter, numeral 14 a fax control unit, numeral 15 a print control unit, numerals 16a, 16b, 16c OR circuits, and numerals 17a, 17b switching control circuits.

These component parts, which are similar to the corresponding parts included in the first embodiment, are designated by the same reference numerals as those in the first embodiment respectively and will not explained any further. The difference between this embodiment and the first embodiment resides in the addition of a print-busy control signal line, designated by 18a or 18b, for also applying a print permit signal such as a TOP signal or a HSYNC signal to the other control unit. As a result, the print permit signal is applied to both the print control unit 15 and the fax control unit 14.

Figure 4:
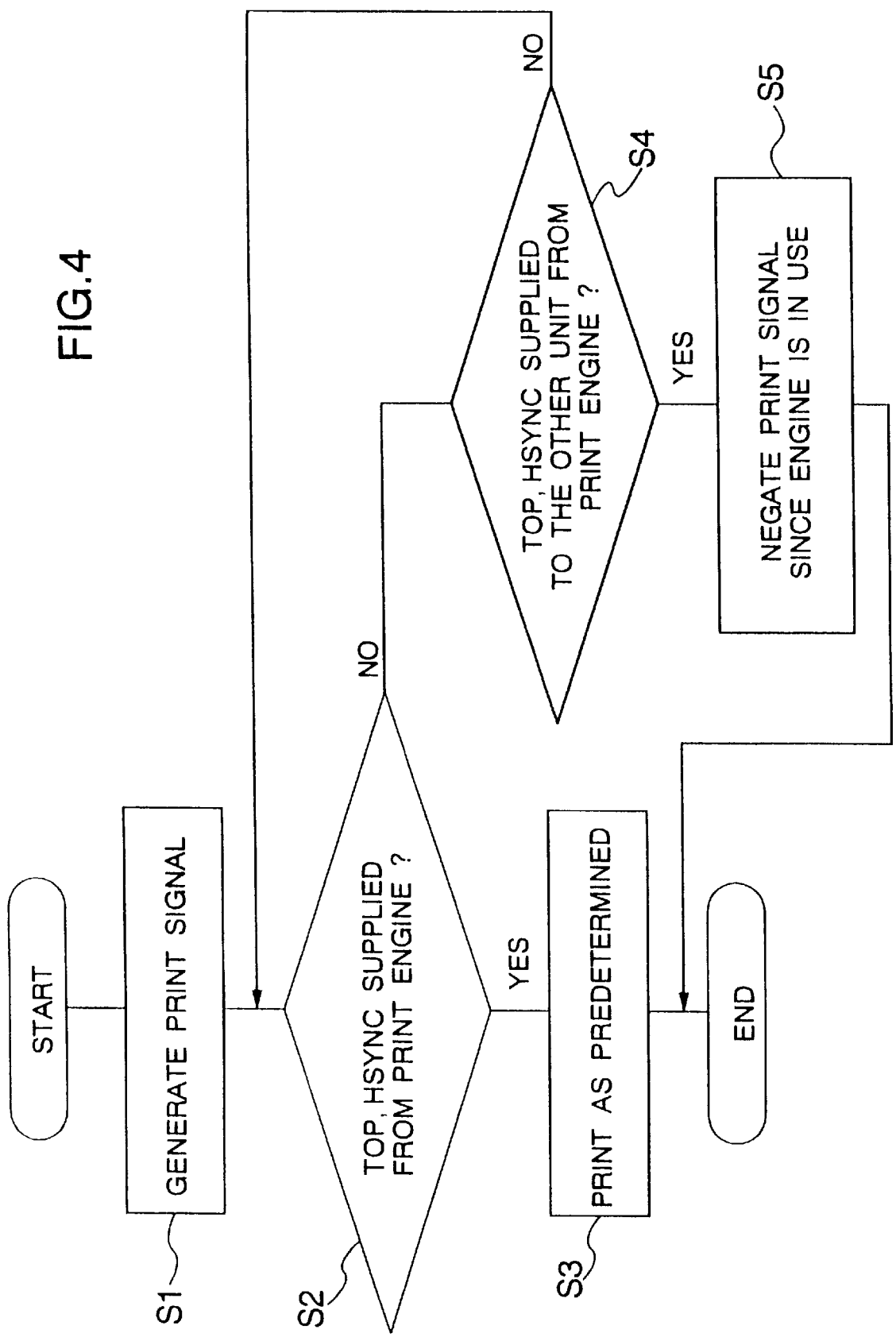
FIG. 4 is a flowchart for the printing operation of a multi-function image processing system according to the second embodiment of the invention.

The operation of the multi-function image processing system according to the second embodiment of the invention configured as described above will be described with reference to a flowchart shown in FIG. 4.

The second embodiment will be described with reference to the case in which a print request is issued first from the host computer 2. The print control unit 15, upon preparation of print data, transmits a print request signal to the OR circuit 16a of the engine interface arbiter 13 through the print engine interface 12. The engine interface arbiter 13 transmits the print request signal to the print engine 9 for requesting the printing operation (step S1).

The print engine 9, if not busy with the printing operation, i.e., ready for the printing operation, performs a predetermined process of printing operation in compliance with the print request, and at the same time, applies a print permit signal including the TOP signal and the HSYNC signal through the switching control circuit 17a only to the print control unit 15 which has generated the print request signal. The print control unit 15 which has generated the print request signal confirms these signals (step S2), and upon successful confirmation, applies print data to the print engine 9 through the OR circuit 16c of the engine interface arbiter 13 based on the TOP signal and the HSYNC signal for performing a predetermined process of printing operation (step S3).

In the case where the TOP signal or the HSYNC signal is not returned in spite of generation of a print request signal at step S2, the return of the TOP signal and the HSYNC signal is confirmed from a print-busy control line 18a or 18b separately added (step S4).

In the event that the TOP signal and the HSYNC signal are confirmed through the added print-busy control line 18a, it indicates that the print engine 9 is occupied by the fax control unit 14, and therefore the print control unit 15 can negate the print request signal (step S5) to interrupt the printing operation so that a different task can be executed temporarily.

As described above, according to this embodiment, the operating conditions of the print engine 9 can be easily judged by the fax control unit 14 and the print control unit 15. In the case where one control unit is in printing operation occupying the print engine 9, the other control unit can avoid waiting simply for printing without making the system unusable. In the meantime, the fax control unit 14 or the print control unit 15, as the case may be, can be engaged in other processes such as preparation of print data for the next page or the processing of received data. The control speed and the operability thus are further improved.

(Embodiment 3)

Figure 5:
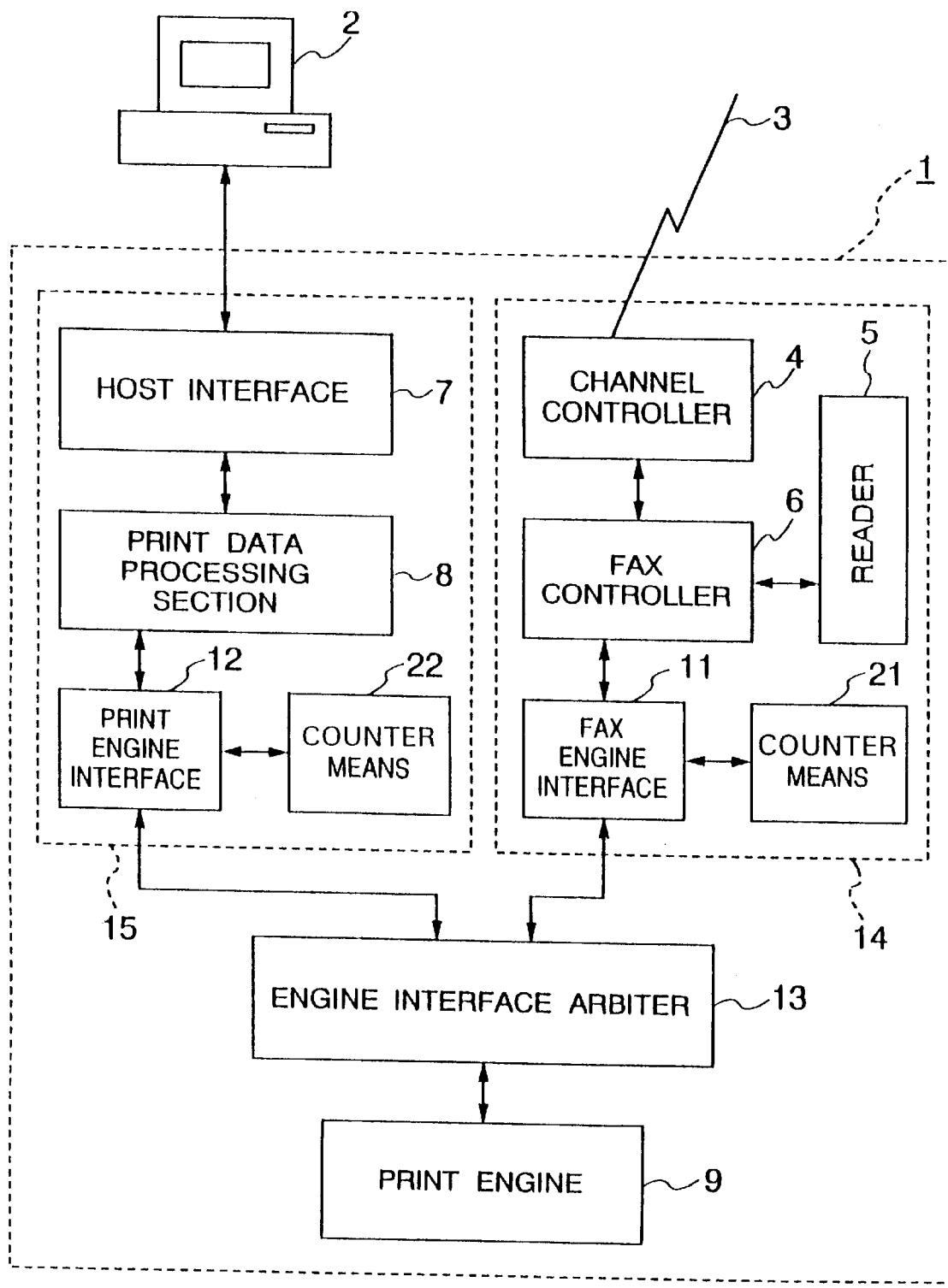
FIG. 5 is a block diagram showing a configuration of a multi-function image processing system according to a third embodiment of the invention.

Now, explanation will be made about a multi-function image processing system according to a third embodiment of the invention referring to FIG. 5. The component parts of the third embodiment, which are similar to the corresponding parts of the first embodiment respectively, are designated by the same reference numerals respectively as in the first embodiment and will not be described any further. This embodiment is different from the first embodiment by counter means 22 and 21 for counting a predetermined number in the case where a print permit is not returned from the print engine 9 in response to a print request sent to the print engine 9 by the fax engine interface 11 or the print engine interface 12. Each of the counter means 22 and 21 may be realized by an iterative operation using control software of each control unit.

Figure 6:
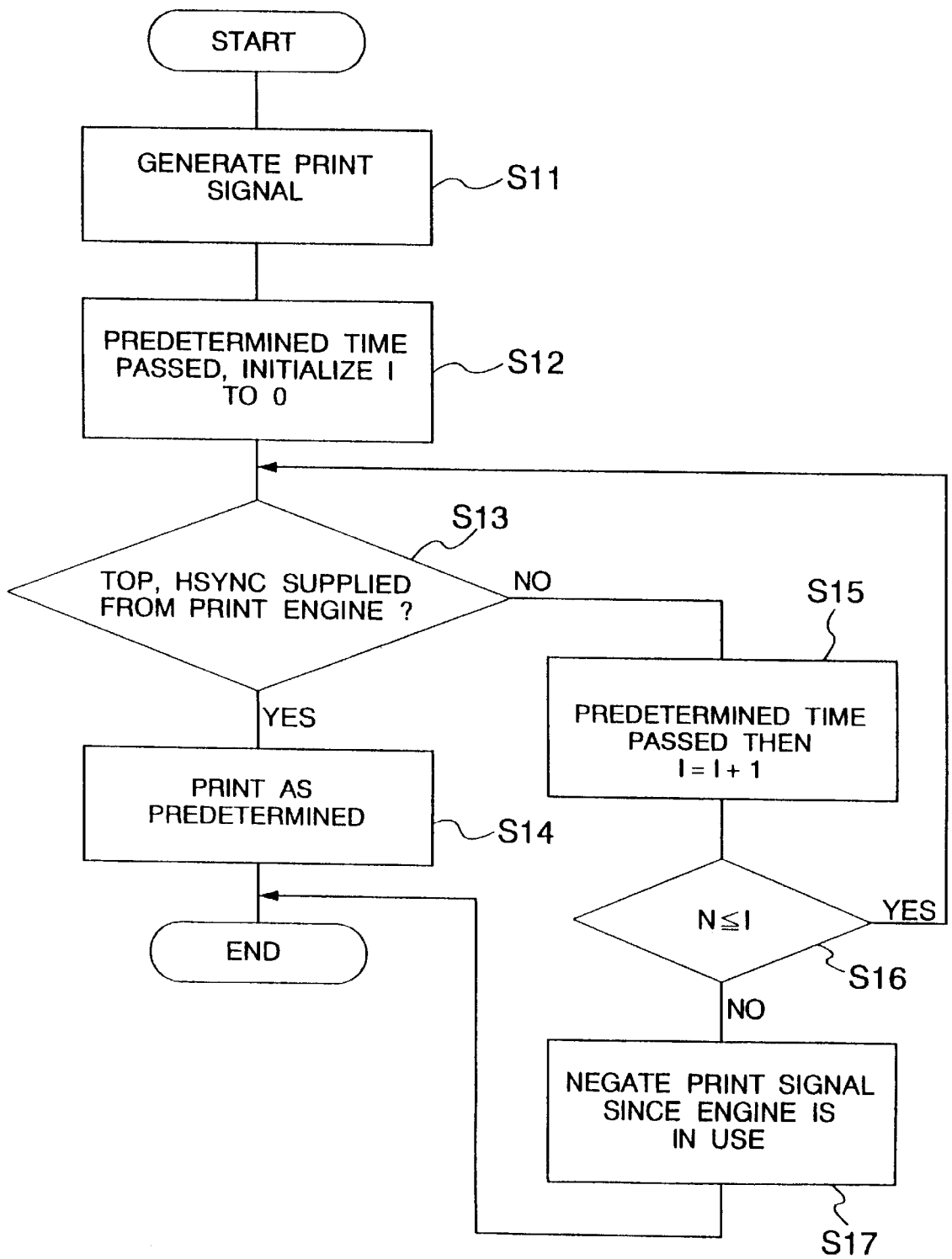
FIG. 6 is a timing chart for the printing operation of a multi-function image processing system according to the third embodiment of the invention.

The operation of a multi-function image processing system according to the third embodiment of the invention configured as described above will be explained on the assumption that a print request is first generated from the fax control unit 14. FIG. 6 is a flowchart representing the printing operation by a multi-function image processing system according to the third embodiment of the invention.

First, when print data are prepared by the fax control unit 14, a print request is transmitted from the fax engine interface 11 through the OR circuit 16a of the engine interface arbiter 13 to the print engine 9 for requesting a printing operation (step S11).

The print engine 9, if ready for printing, performs a predetermined printing operation in accordance with the print request. In detail, after a predetermined length of time has passed since receiving the print request, the print engine 9 applies the TOP signal and the HSYNC signal through the switching control circuit 17a only to the fax control unit 14 which has first generated the print request signal. The fax control unit 14 which has first generated the print request signal, after the lapse of a predetermined length of time (step S12), confirms whether the TOP signal and the HSYNC signal are returned from the print engine 9 (step S13). When the return of the TOP signal and the HSYNC signal is confirmed, the fax control unit 14 transmits the print data through the OR circuit 16c to the print engine 9 according to the TOP signal and the HSYNC signal for performing a predetermined printing process for actual printing operation (step S14).

In the event that the TOP signal and the HSYNC signal are not returned in spite of a print request signal having been transmitted, on the other hand, the number I of confirmation is incremented by one after the lapse of each predetermined length of time (step S15) thereby to confirm whether the number I has reached a predetermined number N (step S16) of confirmations. Unless the number I of confirmations has reached N, the TOP signal and the HSYNC signal are confirmed again (step S13). In the case where the number I has reached N (step S16), on the other hand, the print engine 9, it is decided that the print engine 9 is occupied by the other control unit and the print request signal is negated (step S17). Thus the printing operation is terminated and a task other than printing can be temporarily performed.

As described above, according to this embodiment, each control unit can easily decide whether the other control unit occupies the print engine using a counter supported in software without any dedicated control line. Each control unit, therefore, can carry out other tasks such as preparation of the print data for the next page or the received data while the other control unit is using the print engine, resulting in an improved operability and a reduced system cost.

(Embodiment 4)

Figure 7:
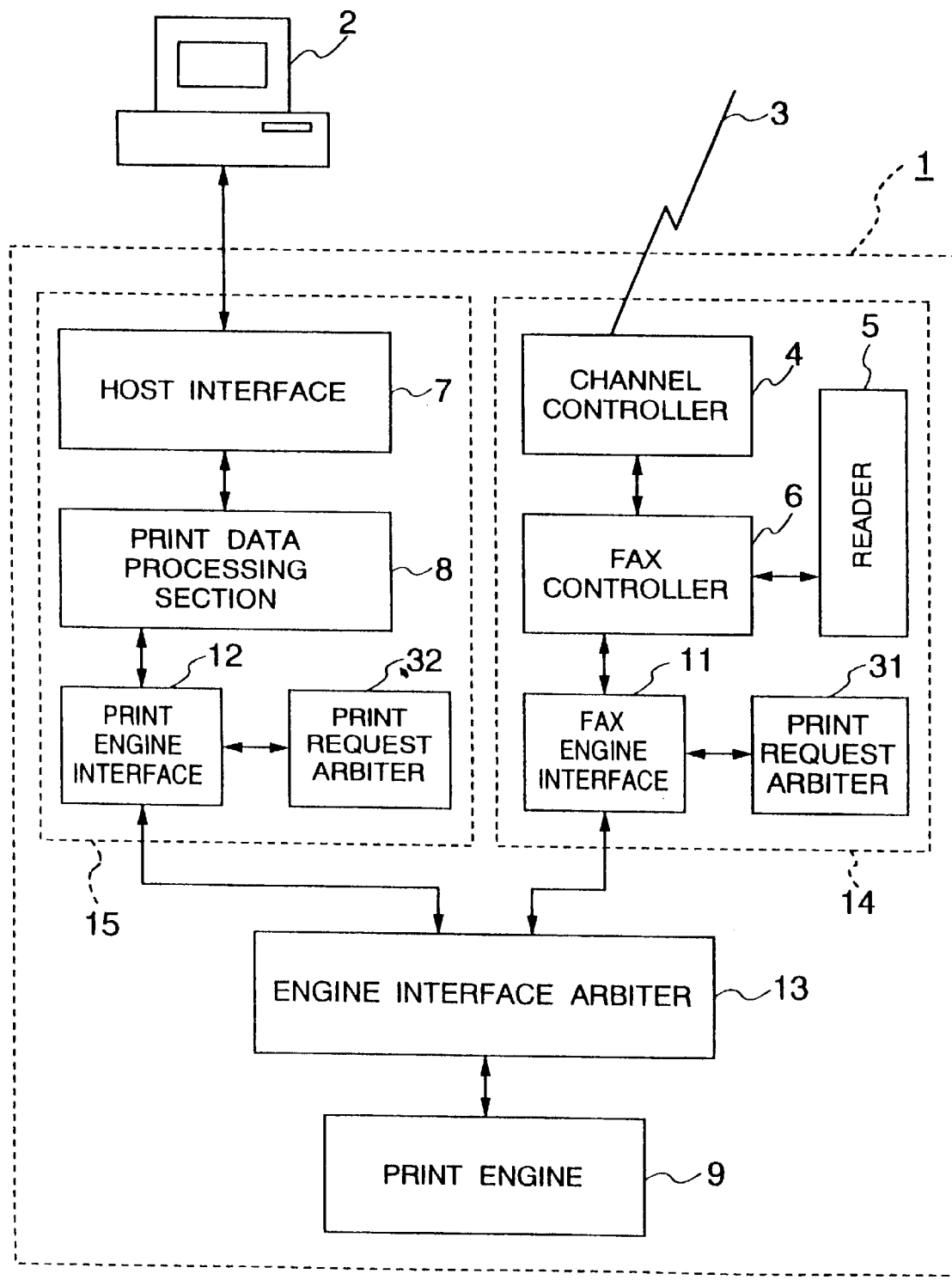
FIG. 7 is a block diagram showing a configuration of a multi-function image processing system according to a fourth embodiment of the invention.

Now, explanation will be made about a multi-function image processing system according to a fourth embodiment of the invention referring to FIG. 7. The fax control unit 14 and the print control unit 15 include a print request arbiters 31 and 32, respectively. The print request arbiters 31 and 32 assign a predetermined time, which is necessary for the print engine 9 to respond to the fax engine interface 11 and the print engine interface 12, to both interfaces in a time division manner when both interfaces issue print requests.

Figure 8:
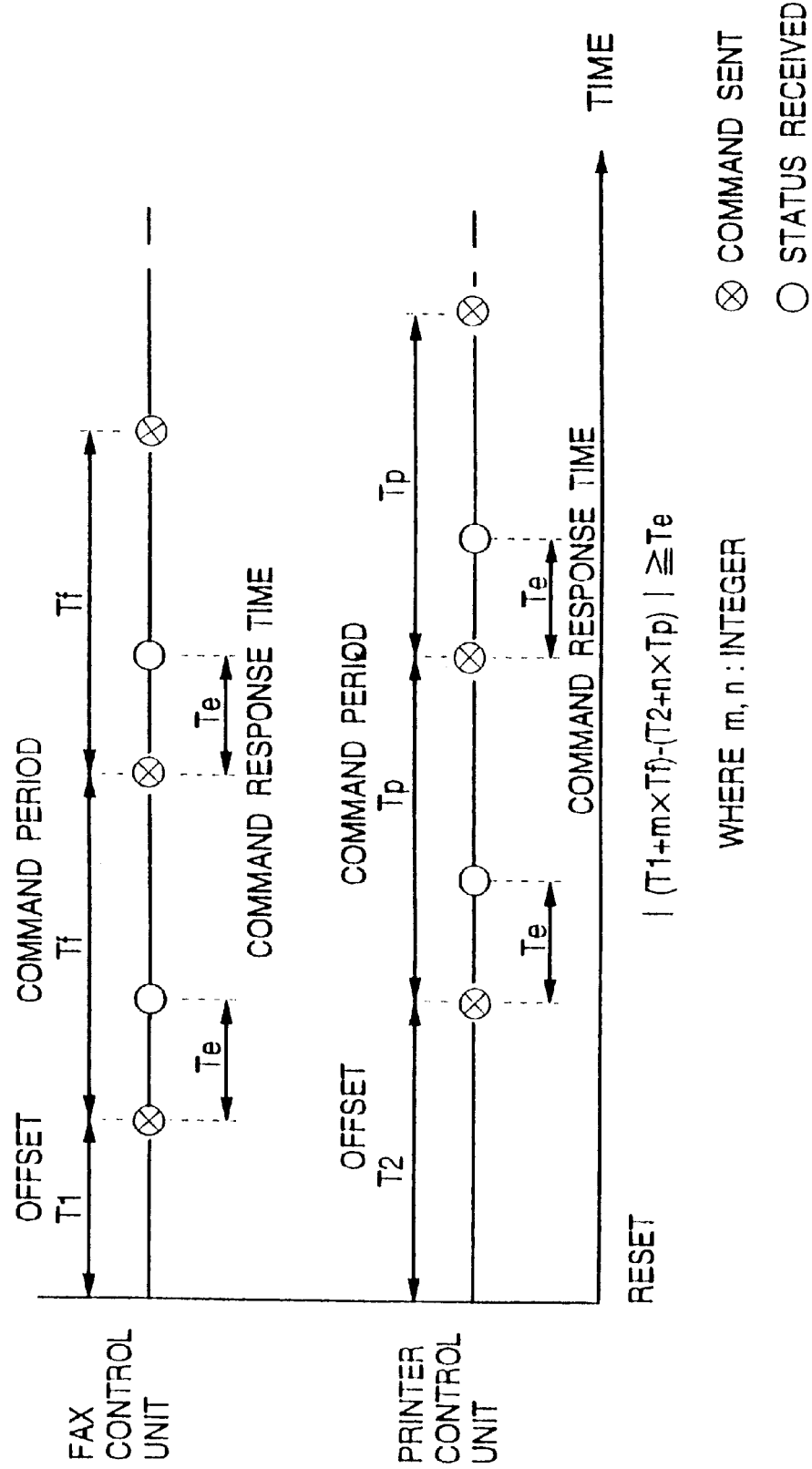
FIG. 8 is a flowchart for the printing operation of a multi-function image processing system according to the fourth embodiment of the invention.

FIG. 8 is a timing chart representing an example of command generation for the multi-function image processing system according to a fourth embodiment of the invention. The control units 14 and 15 send out commands for setting the operating mode or condition check to the print engine 9. The timing of sending such commands is governed by the relation specified below.

$$|(T1+m \times Tf)-(T2+n \times Tp)| \geq Te$$

where T1 or T2 is offset time, that is the time of generation of a command first issued after each control unit is reset, Tf or Tp is the period of command generation, Te is the response time of the print engine 9 to a command, and m or n is a given integer.

As will be seen from the foregoing description, according to the fourth embodiment, a command is not issued at the same time to the print engine 9 by the control units 14 and 15 as shown in FIG. 8, and therefore commands and other control signals can be transmitted securely to the print engine 9. Also, the control procedure supported in software for the print engine 9 can be simplified since only one status is returned for each command.

(Embodiment 5)

Figure 9:
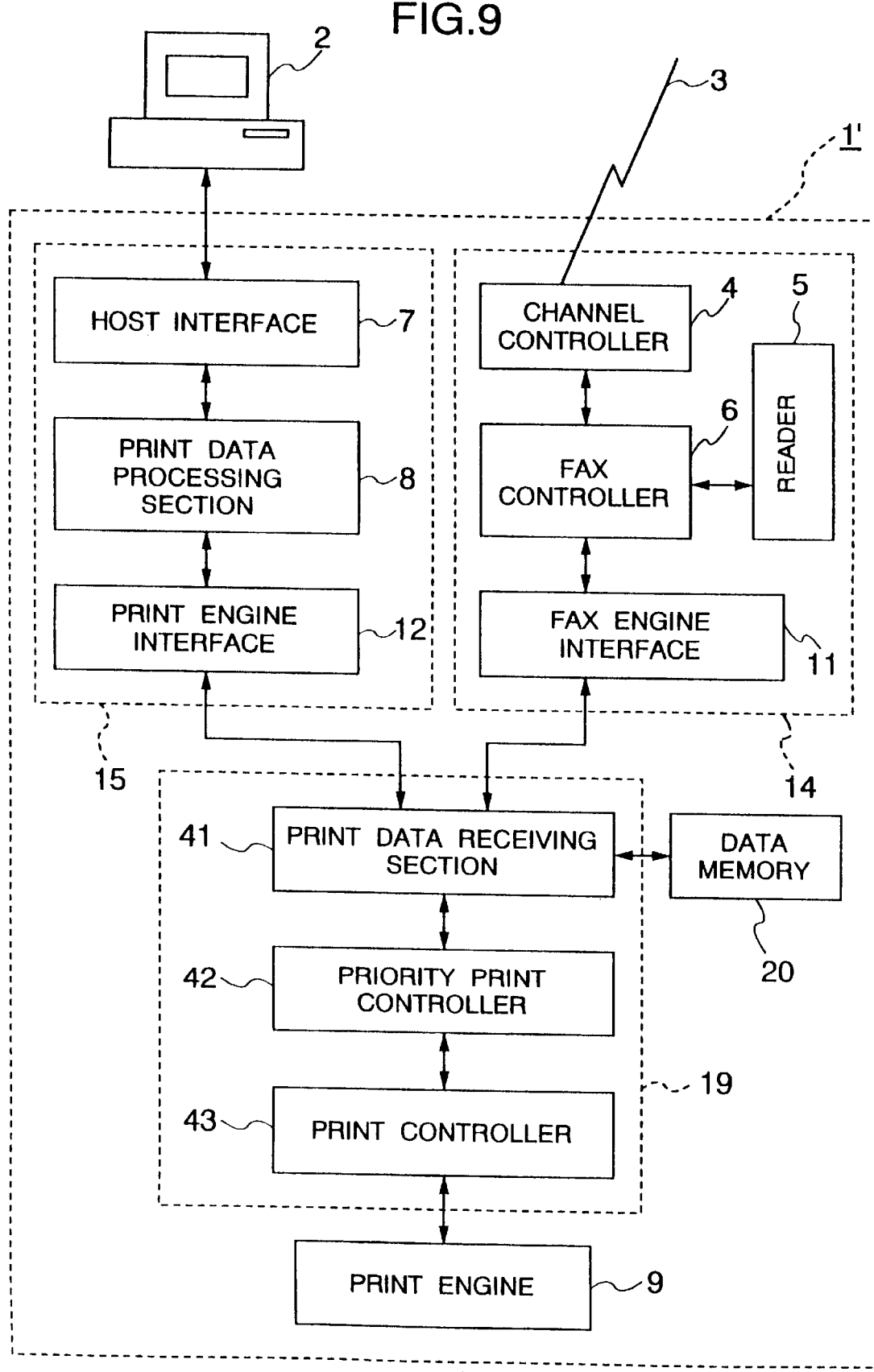
FIG. 9 is a block diagram showing a configuration of a multi-function image processing system according to a fifth embodiment of the invention.

A multi-function image processing system according to a fifth embodiment of the invention will be described below. FIG. 9 is a block diagram showing a configuration of a multi-function image processing system according to the fifth embodiment of the invention. Numeral 1' designates a multi-function image processing system according to the fifth embodiment of the invention. Numeral 2 designates a host computer, numeral 7 a public line, numeral 4 a channel controller, numeral 5 a reader, numeral 6 a fax controller, numeral 7 a host interface, numeral 8 a print data controller, numeral 9 a print engine, numeral 11 a fax engine interface, numeral 12 a print engine interface, numeral 14 a fax control unit, and numeral 15 a printer control unit. These component parts, which are similar to those of the first embodiment in FIG. 1, are respectively designated by the same reference numerals as the latter and will not be described any further. The present embodiment is different from the first embodiment in that the present embodiment further comprises an engine interface arbiter 19 including a data memory 20 capable of storing a plurality of print data.

Further, the engine interface arbiter 19 includes a print controller 43 for controlling the print engine 9 to print the print data stored in the data memory 20 in accordance with a control signal from the print engine 9, and a print data receiving section 41 for receiving the print data from each control unit. The print data includes a print priority order information field specifying the order of print priority. The engine interface arbiter 19 further includes a priority print controller 42 for controlling the printing operation of the print engine 9 in accordance with the priority order of the print data stored in the data memory.

Each control unit 14, 15 causes the fax engine interface 11 or the print engine interface 12 that can prepare print data to issue a print request signal and transmit the print data to the engine interface arbiter 19.

In this process, if memory space is available of the data memory 20 even in the case where the print engine 9 is in printing operation, the engine interface arbiter 19 accepts the print request signal from each control unit and transfers a provisional control signal including the TOP signal and the HSYNC signal to the control unit that has issued the print request. In response, the control unit that has issued the print request quickly transfers the print data to the data memory 20 of the engine interface arbiter 19. The print data is transferred to the engine interface arbiter 19 together with the print priority order information indicating the order of print priority.

A print request is made to the print engine 9 from the engine interface arbiter 19 so as to print out the print data stored in the data memory 20 in accordance with the print priority information contained in the print data stored in the data memory 20 or the order of data storage in the data memory 20. In the case where the print engine 9 is ready for printing, the engine interface arbiter 19 and the print engine 9 perform a predetermined printing operation independently of each control unit. More specifically, a print request signal is issued from the engine interface arbiter 19 to the print engine 9, and the print engine 9 transmits the TOP signal and the HSYNC signal to the engine interface arbiter 19. The engine interface arbiter 19 confirms these signals, and after successful confirmation, sends print data from the data memory 20 to the print engine 9 on the basis of the TOP signal and the HSYNC signal, so that the printing procedure is processed by the priority print controller 42.

As described above, according to this embodiment, each control unit can use the printer engine 9 without being limited by the printing speed of the print engine 9 but by the data transfer rate and the capacity of the data memory 20 of the engine interface arbiter 19. The print data thus can be printed at high speed, and a considerable improvement is achieved in operability.

Further, the print data can be sent to the interface arbiter 19 with priority information attached thereto specifying the order of printing. The print engine 9, therefore, can be utilized effectively and efficiently depending on applications and objects.

As described above, according to the invention, the presence of the engine interface arbiter presents the appearance from each control unit as if a single print engine is connected, and the appearance from the print engine as if a single control unit is connected. For this reason, each control unit can easily realize control means in software for the portion thereof interfaced with the print engine, and similarly the print engine can easily realize control means in software for the portion interfaced with each control unit. It thus is possible to realize a highly reliable multi-function image processing system.

Furthermore, since the engine interface arbiter can be realized by a simple hardware configuration, the system cost can be reduced. In addition, each control unit can decide on its own whether the print engine is available for use, and therefore the print engine can be efficiently used. This leads to an effective utilization of resources, realizes a comfortable operation, and a superior operability of a multi-function image processing system.

This embodiment may further comprise a print-busy control line as a control line from the print engine to the control unit not selected in addition to a control line to the other control unit selected through a switching control circuit in accordance with the input to an OR circuit. Each control unit, therefore, can decide by control software whether the print engine is in use or not by monitoring the print-busy control signal thus added even when the other control unit occupies the print engine. The control unit not selected thus can carry out other tasks rapidly. A multi-function image processing system capable of utilizing the resources effectively thus is realized.

Further, each control unit can decide without using any dedicated control line whether the print engine is available for use. A multi-function image processing system thus is realized which is capable of utilizing the print engine with a low cost.

Furthermore, in the case the print engine interface or the fax engine interface transmits a control signal including a command or the like to the print engine, a predetermined length of time required at least for response to each unit is assigned to each unit by time division through a print request arbiter thereby to adjust the access time of each unit and avoid the simultaneous occurrence of responses from the units. Commands are thus not generated from different units at the same time, and can be accurately transmitted to the print engine. At the same time, development of new software is not required of the print engine for processing commands, thereby realizing a low-cost multi-function image processing system high in mass productivity.

Another advantage is due to the fact that the engine interface arbiter includes a data memory for storing a plurality of print data, a print controller for printing the print data from the data memory in accordance with a control signal from the print engine, and a print data receiving controller for receiving print data from each control unit. The print data from each control unit thus can be transmitted rapidly to the engine interface arbiter. A data signal from the public line can be smoothly received for the fax control unit, and therefore the waiting time is minimized. The fax function can thus be effectively utilized in accordance with the applications and objects of the user. The print engine can sequentially print the print data stored in the data memory, thereby realizing a multi-function image processing system capable of utilizing the resources effectively and high in operability.

Still another advantage is that the print data includes a print priority order information field indicating the order of priority of printing the print data, and the engine interface arbiter includes a priority print controller for causing the print engine to print the print data from the data memory in accordance with the print priority order specified for each print data. In this way, the order of priority for using each control unit can be determined by the user in a manner meeting the requirement of a particular application. The print engine can thus be efficiently used, and a multi-function image processing system high in operability is realized.

We claim:

1. A multi-function image processing system comprising:

a print engine for printing an image on the basis of print data;

a host interface for transmitting and receiving data to and from an external apparatus including a host computer;

a print data processor for receiving and processing the data from the host interface to produce the print data;

a print engine interface for transmitting the print data from the print data processor to the print engine;

a channel controller for controlling an interface operation with a public line;

a reader for scanning an original text and converting information of the original text into image data;

a facsimile controller for transmitting image data from the reader through the channel controller and receiving and processing the image data from the channel controller to produce the print data;

a facsimile engine interface for transmitting the print data from the facsimile controller to the print engine; and an engine interface arbiter for arbitrating transmission and reception of the print data between the print engine interface and the print engine and between the facsimile engine interface and the print engine.

2. A multi-function image processing system according to claim 1, wherein the engine interface arbiter includes:

a logical sum circuit for obtaining a logical sum of a print request signal transmitted from the print engine interface and a print request signal transmitted from the facsimile engine interface to apply the resulting logical sum to the print engine; and a switching control circuit for transmitting a print permit signal, which permits a printing operations, from the print engine to a selected one of the print engine interface and the facsimile engine interface which has earlier transmitted the print request signal.

3. A multi-function image processing system according to claim 1, wherein the engine interface arbiter includes:

print-busy control lines each for transmitting an active signal, which indicates whether or not the print engine is in use, to a respective one of the print engine interface and the facsimile engine interface.

4. A multi-function image processing system according to claim 1, further comprising:

a first counter electrically connected to the print engine interface and a second counter electrically connected to the facsimile engine interface, each of the first counter and the second counter counting a predetermined length of time in the case where a print permit signal is not returned from the print engine after a print request signal is transmitted to the print engine.

5. A multi-function image processing system according to claim 1, further comprising:

a first print request arbiter electrically connected to the print engine interface and a second print request arbiter electrically connected to the facsimile engine interface, each of the first print request arbiter and the second print request arbiter assigning a predetermined length of time, which is requested for the print engine to respond to a control signal transmitted thereto, to a respective one of the print engine interface and the facsimile engine interface in a time division fashion.

6. A multi-function image processing system according to claim 1, wherein the engine interface arbiter includes:

a data memory for storing a plurality of print data;

a print controller for controlling the print engine to print the print data stored in the data memory in accordance with a control signal from the print engine; and a print data receiving section for receiving the print data from a selected one of the print engine interface and the facsimile engine interface.

7. A multi-function image processing system according to claim 6, wherein:

the print data includes a priority print order information field indicating the priority order of printing for the respective print data; and the engine interface arbiter includes a priority print controller for controlling the print engine to print the print data stored in the data memory in accordance with the priority order of printing.

8. A multi-function image processing system according to claim 2, wherein the engine interface arbiter includes:

print-busy control lines each for transmitting an active signal, which indicates whether or not the print engine is in use, to a respective one of the print engine interface and the facsimile engine interface.

9. A multi-function image processing system according to claim 2, further comprising:

a first counter electrically connected to the print engine interface and a second counter electrically connected to the facsimile engine interface, each of the first and second counters counting a predetermined length of time in the case where the print permit signal is not returned from the print engine after the print request signal is transmitted to the print engine.

10. A multi-function image processing system according to claim 2, further comprising:

a first print request arbiter electrically connected to the print engine interface and a second print request arbiter electrically connected to the facsimile engine interface, each of the first and second print request arbiter assigning a predetermined length of time, which is required for the print engine to respond to a control signal transmitted thereto, to a respective one of the print engine interface and the facsimile engine interface in a time division fashion.

11. A multi-function image processing system according to claim 3, further comprising:

a first print request arbiter electrically connected to the print engine interface and a second print request arbiter electrically connected to the facsimile engine interface, each of the first and second print request arbiter assigning a predetermined length of time, which is required for the print engine to respond to a control signal transmitted thereto, to a respective one of the print engine interface and the facsimile engine interface in a time division fashion.

12. A multi-function image processing system according to claim 4, further comprising:

a first print request arbiter electrically connected to the print engine interface and a second print request arbiter electrically connected to the facsimile engine interface, each of the first and second print request arbiter assigning a predetermined length of time, which is required for the print engine to respond to a control signal transmitted thereto, to a respective one of the print engine interface and the facsimile engine interface in a time division fashion.

13. A multi-function image processing system according to claim 8, further comprising:

a first print request arbiter electrically connected to the print engine interface and a second print request arbiter electrically connected to the facsimile engine interface, each of the first and second print request arbiter assigning a predetermined length of time, which is required for the print engine to respond to a control signal transmitted thereto, to a respective one of the print engine interface and the facsimile engine interface in a time division fashion.

14. A multi-function image processing system according to claim 9, further comprising:

a first print request arbiter electrically connected to the print engine interface and a second print request arbiter electrically connected to the facsimile engine interface, each of the first and second print request arbiter assigning a predetermined length of time, which is required for the print engine to respond to a control signal transmitted thereto, to a respective one of the print engine interface and the facsimile engine interface in a time division fashion.

\* \* \* \* \*